(12) United States Patent
Musso et al.

(10) Patent No.: US 6,458,862 B1
(45) Date of Patent: Oct. 1, 2002

(54) FOAMING AGENTS

(75) Inventors: Ezio Musso, Castelleto d'Orba (IT); Mario Visca, Alessandria (IT); Giampiero Basile, Alessandria (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/369,931

(22) Filed: Aug. 9, 1999

(30) Foreign Application Priority Data

Aug. 11, 1998 (IT) .......................................... MI98A1882

(51) Int. Cl.[7] .............................................. C08G 18/08
(52) U.S. Cl. ........................ 521/131; 521/114; 521/170; 521/174
(58) Field of Search ................................ 568/407, 615; 521/131, 114, 170, 174

(56) References Cited

FOREIGN PATENT DOCUMENTS

| EP | 0 695 775 B1 | 12/1998 |
|---|---|---|
| WO | WO 95/32174 | 11/1995 |

OTHER PUBLICATIONS

Chem Abstract: 126:254,653 (1997).*

Chem Abstract: 129:249,427 (1998).*

Gerhardt & Lagow: "Synthesis of perfluoropolyethers by direct fluorination", *Journal of Chemical Society*, vol. 1, No. 5, (1981) pp. 1321–1328.

* cited by examiner

*Primary Examiner*—John M. Cooney, Jr.
(74) *Attorney, Agent, or Firm*—Arent Fox Kintner Plotkin & Kahn

(57) ABSTRACT

Hydrofluoropolyether foaming agents selected from:
- difluoromethoxy-bis(difluoromethyl ether) of formula $HCF_2OCF_2OCF_2H$; and/or
- 1-difluoromethoxy-1,1,2,2-tetrafluoroethyl difluoromethyl ether of formula $HCF_2OCF_2CF_2OCF_2H$, and their use in polyurethane foams.

4 Claims, No Drawings

FOAMING AGENTS

The present invention relates to the use of hydrofluoropolyethers (HFPE) as foaming agents in substitution of trichloro-fluoromethane (CFC 11). Said foaming agents are used to prepare polymeric foams, specifically polyurethane foams.

More specifically the present invention relates to the use of hydrofluoropolyethers as foaming agents, characterized by low GWP values (Global Warming Potential) and by ODP (Ozone Depletion Potential) and VOC (Volatile organic Compounds) values equal to zero to be used in substitution of CFC 11 for preparing polymeric foams, specifically rigid closed cell polyurethanes.

The foamed polymer application is well known. For illustrative purposes the application concerning polyurethanes is hereinafter reported. In particular, as it is known, foamed polyurethanes represent a class of materials widely used for applications concerning the furnishing, car and in general transport, building and cooling industry.

Polyurethanes are polyaddition products between isocyanates and polyols; depending on the precursor features, it is possible to obtain flexible, rigid foams, or foams having intermediate characteristics.

The former are used in the furnishing and car sector, while rigid closed cell polyurethanes are widely used in the thermal insulation field for building and cooling industry.

All the polyurethane foams require a foaming agent for their preparation in order to obtain cellular structures, density, mechanical and insulation properties suitable for any application type.

In particular, the rigid polyurethane insulating properties are given by the presence of closed cells internally containing foaming agent vapours characterized by low thermal conductibility values.

As known, the main foaming agent used for the preparation of rigid foamed polyurethanes has been CFC 11.

A great part of the technology relating to rigid polyurethanes for the thermal insulation has been for a long time developed and optimized for the use of this foaming agent.

CFC 11 is characterized by particular chemical physical properties such as to be advantageously used in the previously described sector and allows, furthermore, a simple, cheap and safe use since it is chemically stable, non flammable and non toxic.

CFCs and specifically CFC 11 have, however, the drawback to show a high destroying power on the stratospheric ozone layer, therefore, the production and commercialization have been subjected to rules and then banned since Jan. 1, 1995.

The need is therefore particularly felt to identify alternative products able to replace CFC 11 in the mentioned application fields while respecting and protecting the environment.

In the foamed polyurethane field, the use versatility of these products, which allows applications in different fields with the use of suitable technologies and raw material formulations, has made impossible the identification of a single product valid for the replacement of CFC 11 in all applications.

The alternative solutions which now result widely used foresee the use of hydrocarbons (n-pentane, iso-pentane and cyclo-pentane) or of HCFC 141b (1,1-dichloro-1-fluoroethane: $CCl_2FCH_3$).

Hydrocarbons, due to their high flammability, have not a generalized use and require large investments to avoid fire and explosion risks in plants and rooms wherein they are used or stored.

Furthermore, these foaming agents constitute an atmospheric pollution source since, if exposed to the sun light in the presence of nitrogen oxides, they undergo oxidative degradation phenomena, with formation of the so called ozone-rich "oxidizing smog". Due to this negative characteristic, these products are classified as VOC compounds (Volatile Organic Compound).

HCFC 141b, which has been and is one of the most valid substitutes for above applications, has however the drawback to be moderately flammable and especially to be characterized by an ODP value equal to 0.11 (CFC 11 has ODP=1) and therefore it has been subjected to restricted use.

Besides, another drawback of all the above mentioned substitutes is that they are characterized by thermal conductibility values higher than CFC 11, with consequent decrease of the insulating power of the foaming agents.

There was a need to have available substitutes able to furtherly limit or overcome the above mentioned environmental and safety problems and which allow a simpler and generalized use as foaming agents, with the possibility to obtain results similar to those obtained with CFC 11.

The Applicant has unexpectedly found that the hydrofluoropolyethers (HFPE) object of the present invention are characterized by chemical-physical properties such to be suitable as substituent of CFC 11, they are non flammable, have an environmental impact expressed in ODP and VOC equal to zero, and low GWP values.

It is therefore an object of the present invention hydrofluoropolyether foaming agents:

difluoromethoxy-bis(difluoromethyl ether) (indicated as HFPE1) of formula $HCF_2OCF_2OCF_2H$; and/or 1-difluoromethoxy-1,1,2,2-tetrafluoroethyl difluoromethyl ether (indicated as HFPE2) of formula $HCF_2OCF_2CF_2OCF_2H$.

The main characteristics of the hydrofluoropolyethers of the present invention are reported in Table 1 in comparison with CFC 11 and HCFC 141b. The hydrofluoropolyethers are characterized by a combination of chemical-physical properties such as:

chemical inertia
high thermal stability
suitable boiling temperature
low thermal conductibility
suitable solubility in polyols
low solvent power towards the polyurethane matrix such as to be particularly suitable, as pure fluids or in admixture with each other, for the CFC 11 replacement in the foamed polymer field, specifically in the rigid polyurethanes field.

The preliminary studies on the acute toxicity show that the hydrofluoropolyethers reported in Table 1 have a low biologic activity.

It has been found by the Applicant that the particular hydrogen atom distribution on the terminal ends and the presence of an ethereal bond prevents dehydrofluorination reactions, which would lead to toxic olefins formation and avoids the acidity formation which would imply metal material corrosion phenomena and inactivation of basic catalysts generally used in foaming agent formulations, specifically in polyurethane formulations.

These decomposition reactions which are typical of hydrofluorocarbons (ex: HCFC 141b, HCFC 123: 1,1 dichloro-2,2,2 trifluoro ethane, HCFC 22: chlorotrifluoro methane) and of some hydrofluorocarbons, are favoured by the presence of basic catalysts used in foaming agent formulations, specifically in polyurethane formulations; they are catalyzed by metals and by heat.

In order to avoid or limit the decomposition of these foaming agents, it is necessary to use stabilizers and/or select less reactive polyols.

Another advantage of the foaming agents of the present invention consists in that they do not require stabilizers as an essential component, and that they can be used also with the catalysts and the most reactive polyols. At any rate stabilizers can be added as optional components.

It has been found by the Applicant that the particular chemical structure of the present invention hydrofluoropolyesters confers a good solubility in the polyols, such as to guarantee the foaming agent preparation with sufficiently low densities without having an excessive solvent power towards the polymeric matrix of the final foaming agent.

The invention HFPE have an ODP value equal to zero and a low GWP value. It has been found that the presence of the hydrogen atoms on the molecule end groups favours the decomposition reactions in the atmosphere and limits the half-life time thereof, with consequent benefit on the direct greenhouse effect generated by the product.

The suitable combination of the above mentioned hydrofluoropolyether properties allows to obtain foams having good properties in terms of thermal conductibility, density, morphology, dimensional stability, mechanical resistance and fire-reactivity.

It has been found that hydrofluoropolyethers having an higher molecular weight, with boiling temperatures higher than 65° C., lead to the formation of foaming agents with coarse cellular structures not suitable to obtain low densities. Furthermore in many cases, with the hydrofluoropolyethers having high molecular weight, colapsing phenomena of the growing foam have been noticed.

The homologue having a lower molecular weight ($HCF_2OCF_2H$), with boiling tempertures of 6° C., involves handling problems due to the high vapour pressure; besides during the foam preparation frothing phenomena (bubble formation) are noticed which determine foaming agent loss and unhomogeneous cellular structure formation. Furthermore, the product is characterized by high thermal conductibility values equal to 15 mW/mK at 60° C.

It has been surprisingly and unexpectedly found that the invention hdydrofluoropolyethers, characterized by a well defined O/C molar ratio of 0.6 and 0.5 respectively in combination with particular boiling points allow to obtain foaming agents of very good quality. This fact is surprising and unexpected since tests carried out by the Applicant have shown that the perfluoropolyethers or perfluoropolyethers containing only one hydrogen atom are unsoluble or have a poor solubility in polyols, they have very high GWP values and require for their use (products with boiling point lower than 70° C.) the need to disperse the unsoluble product in the polyols, with emulsion formation, using expensive and not very common technologies in this field. Furthermore, the so obtained emulsions are often not very stable during the time and this involves further use problems. It is indeed necessary to prepare and use the emulsions in short times in order to avoid considerable separation phenomena of the foaming agent from the polyol and consequent production difficulties. Therefore it is not possible to prepare preformulations sufficiently stable to be easily distributed and used by the several final users. The preformulations are generally constituted by polyol, catalyst, water, surfactant and often by the foaming agent, which in this case would be an essential component of the formulation since it requires, as previously indicated for the homogeneous dispersion in the polyol, the use of expensive and not very common technologies in this field.

The preformulations are therefore distributed to the users who have the simpler task to use and mix the formulation with isocyanate for the preparation of the final polyurethane manufactured article.

The preformulations obtainable with the hydrofluoropolyethers of the present invention surprisingly do not show the above mentioned inconveniences. Another advantage of the present invention hydrofluoropolyethers consists in having good solubility with polyols and therefore to obtain preformulations stable during the time, easy to be used and handled.

The compositions containing the present invention HFPE are able to produce foams with density in the range 10–200, preferably 15–100, and more preferably 20–60 kg/m$^3$.

In order to obtain such densities, the foaming agent is added to the formulations in amounts in the range 1–20% by weight on the total weight of the composition, including the same foaming agent. Preferably in the range 1–15% by weight, more preferably 1.5–10% by weight on the total formulation for the foam preparation.

The present invention HFPEs can also be used in admixture with each other and/or in combination with other foaming agents in such ratio so as to obtain the above indicated densities.

Specifically the present invention HFPEs can also be advantagesously used in combination with $H_2O$ and/or $CO_2$, for example in gas phase.

Water is added to the formulations in amounts in the range 0.5–7 parts by weight on one hundred parts of polyol, preferably 1–6, and more preferably 1.5–4.

The $CO_2$ can be used in concentrations in the range 0.6–10 parts, preferably 1–8 parts by weight on one hundred parts by weigh of polyol.

The isocyanates used for the preparation of the foaming agents of the present invention are polyisocyanates with an average content of isocyanate groups in the range 20–50% by weight and more preferably 20–33% by weight.

The polyols used for these formulations are generally propylene oxide-based polyols having equivalent weights in the range 90–200 and a functionality range generally comprised between 3 and 8 for molecule, deriving from known initiators leading to the formation of the indicated functionalities.

The isocyanate is used in such amount as to obtain in the formulation with the polyol an isocyanate index in the range 1–2, preferably 1–1.6.

As said, the two hydrofluoropolyethers of the invention can be used in admixture with each other. It has been found that the mixtures do not undergo, due to evaporation, important segregation phenomena, since the binary compositions of the two hyrofluoropolyethers in the whole composition range are near azeotropic.

The mixtures having an azeotropic or near azeotropic behaviour are of great importance in order to avoid fractionations or considerable variations of their composition during handling, dosage and storage operations wherein accidental losses can take place due to liquid evaporation and consequently variations of the fluid composition.

The composition variations which take place in all the cases when non azeotropic mixtures are used involve deviations of the foaming agent performances and the need to perform refillings in order to restore the original composition and therefore the mixture chemical-physical characteristics.

The hydrofluoropolyethers and the mixtures thereof can contain in amounts not higher than 10% by weight, hydrofluoropolyethers having the same structure but a boiling point in the range 5°–80° C. In this case, according to the present invention, it is possible to refer to fluids essentially consisting of difluoromethoxy-bis(difluoromethyl ether) and of 1-difluoromethoxy-1,1,2,2-tetrafluoroethyl difluoromethyl ether and mixtures thereof.

A near azeotrope composition is a mixture of two or more fluids which has a vapour composition substantially equal to that of the liquid and undergoes phase changes without substantially modifying the composition and the temperature.

A composition is near azeotropic when, after evaporation at a constant temperature of 50% of the liquid intitial mass, the per cent variation of the vapour pressure between the initial and final composition is lower than 10%.

The hydrofluoropolyethers of the present invention are obtained by alkaline salt decarboxylation processes obtained by hydrolysis and salification of the corresponding acylfluorides, using processes known in the art. For example, decarboxylation is carried out in the presence of hydrogen-donor compounds, for example water, at temperatures of 140–170° C. and under a pressure of at least 4 atm. See for example EP 695,775 and the examples reported therein; this patent is herein incorporated by reference.

The following examples are given for illustrative but not limitative purpose of the present invention.

EXAMPLE 1

Evaluation of the Near Azeotropic Behaviour

The mixture of known composition and weight is introduced in a small glass cell, previously evacuated, having an internal volume equal to 20 cm$^3$, equipped with metal connections, feeding valve and a pressure transducer to estimate the system vapour pressure.

The filling volumetric ratio is initially equal to about 0.8% v.

The cell is introduced in a thermostatic bath and the temperature is slowly changed until obtaining a vapour pressure equilibrium value equal to 1.013 bar. The corresponding temperature is recorded and represents the mixture boiling temperature at the 1.013 bar pressure.

The temperature is measured close to the equilibrium cell with a thermometer the accuracy of which is equal to +/−0.01° C.; particular attention was paid so that the external temperature measured in the bath is really the internal one of the cell.

By changing the mixture composition it is possible to estimate possible deviations with respect to the ideality and therefore to identify the azeotropic composition which, as said, will be characterized by an absolute minumum or maximum with respect to the pure components.

In order to confirm the azeotropic or near azeotropic behaviour, the mixture characterized by a minumum or a maximum of the boiling temperature and others identified close to the azeotropic blend were subjected to evaporation test at the azeotrope constant temperature.

The cell content is removed at constant temperature by evaporation until having a loss corresponding to 50% by weight of the initial amount.

From the evaluation of the initial and final pressure the per cent variation of the vapour pressure is calculated: if the decrease is equal to zero the mixture in those conditions is an azeotrope, if the decrease is <10% its behaviour is of a near azotrope.

It is known that a near azetropic mixture has a behaviour closer and closer to a true azeotrope if the per cent variation is lower and lower and near to zero.

In all the measurements reported in Table 2 the visual observation of the liquid phase at its normal boiling temperature has in any case shown that no phase separations took place and that the solutions were limpid and homogeneous.

TABLE 1

Hydrofluoropolyether chemical-physical and toxicological characteristics

| Chemical formula | $HCF_2OCF_2OCF_2H$ | $HCF_2OCF_2CF_2OCF_2H$ | $CCl_3F$ CFC 11 | $CCl_2FCH_3$ HCFC 141b |
|---|---|---|---|---|
| Molecular mass | 184.04 | 234.05 | 137.37 | 116.94 |
| Boiling temperature, ° C. (1.013 bar) | 35.39 | 58.21 | 23.70 | 32.06 |
| Evaporation latent heat KJ/Kg (1.013 bar) | 165 | 139 | 177 | 217 |
| Liquid density at 25° C., g/cm3 | 1.54 | 1.60 | 1.47 | 1.23 |
| Inflammability in air, % volume | * | * | * | 7.6–17.7§ |
| ODP CFC 11 = 1 | 0 | 0 | 1 | 0.11 |
| lifetime, years | <10 | <10 | 55 | 10.8 |
| Acute toxicity in the oral rat, $LD_{50}$ ppmv/4 hours | >5000 | >5000 | >1000 | >5000 |
| Acute toxicity in the rat by inhalation, $LD_{50}$ ppmv/4 hours | >32000 | >32000 | 26200 | 62000 |
| Vapour thermal conductibility at 60° C. and 1.013 bar mW/mK | <11.8 | <11.8 | 9.8 | 11.8 |

*non flammable
§flammable

TABLE 2

Evaluation of the near azeotropic behaviour by determination of the percent variation of the vapour pressure after evaporation of 50% of the initial liquid mass
Binary mixtures of difluoromethoxy-bis (difluoromethyl ether)/
1-difluoromethoxy-1,1,2,2-tetrafluoroethyl difluoro methyl ether

| Inizial composition $HCF_2OCF_2OCF_2H$/ $HCF_2OCF_2CF_2OCF_2H$ (% weight) | Temperature (° C.) | Initial pressure (bar) | $\Delta P/P \times 100$ (%) |
|---|---|---|---|
| 50.0/50.0 | 43.00 | 1.013 | 9.28 |
| 11.8/83.9* | 53.97 | 1.013 | 6.71 |
| 60.3/39.7 | 41.57 | 1.013 | 5.92 |

*contains 4.3% by weight of heavier impurities formed by HFPE having an higher molecular weight

EXAMPLE 2

Use of HFPE as foaming agents for preparing rigid polyurethanes.

Foams have been prepared according to the following procedure:
In a polyethylene cylindrical container (diameter 12 cm; height 18 cm) 100 g of polyol, the required water amount for each kind of formulation and the foaming agent used for the test, are introduced.

The content is mixed with mechanical stirrer for one minute at the 1900 rpm speed, then isocyanate is added and stirring is still continued at the same speed for 15 seconds.

The foam is allowed to freely expand until completion of the reaction.

A foam portion is taken in the middle of the foamed agent for the visual observation of the homogeneity, of the cellularity characteristics of the foam and for the density determination.

The data are reported in Table 3 (see Examples α, β, γ, δ, ε) in comparison with those obtained with CFC 11 and HCFC 141b (comparative examples α and β).

TABLE 3

| | Example α (comp) | Example β (comp) | Example γ | Example δ | Example ε |
|---|---|---|---|---|---|
| Polyol♣ polyether (g) | 100 | 100 | 100 | 100 | 100 |
| Water pbw (g) | 2 | 2 | 3.3 | 3.5 | 2.0 |
| Aminic catalyst◆ pbw (g) | 2.5 | 2.5 | 2.5 | 2.5 | 2.5 |
| CFC 11 pbw (g) | 30* | | | | |
| HCFC 141b pbw (g) | | 28§ | | | |
| HFPE1/HFPE2 (75/25) pbw (g) | | | 26* | | |
| HFPE1/HFPE2 (20/80) pbw (g) | | | | 22* | |
| HFPE1 pbw (g) | | | | | 35* |
| ISOCYANATE♠ pbw (g) | 160 | 160 | 181 | 185 | 160 |
| Density kg/m³ | 30.1 | 29.7 | 30.5 | 30.0 | 29.5 |
| Foam appearance | GOOD | GOOD | GOOD | GOOD | GOOD |

HFPE1 = $HCF_2OCF_2OCF_2H$
HFPE2 = $HCF_2OCF_2CF_2OCF_2H$
*non flammable
§flammable
♣polyol polyether with an hydroxyl number equal to 500 mg KOH/g and containing silicone surfactant
◆N,N-dimethyl cyclohexylamine
♠Polymeric methylendiphenylisocyanate (MDI) - DESMODUR by Bayer
pbw: parts by weight for 100 g of polyol In the Examples reported in Table 3 the water amount has been dosed at the maximum extent compatible with the general good characteristics of the obtained foams.

What is claimed is:

1. A method for preparing polyurethane manufactured articles comprising preparing a preformulated composition of a hydrofluoropolyether foaming agent selected from difluoromethoxy-bis(difluoromethyl ether) of the formula $HCF_2OCF_2OCF_2H$ and/or 1-difluoromethoxy-1,1,2,2-tetrafluoroethyl difluoromethyl ether of the formula $HCF_2OCF_2CF_2OCF_2H$ and at least one polyol, and mixing the preformulated composition with at least one isocyanate.

2. The method according to claim 1 wherein the hydrofluoropolyether is blended with $H_2O$ and/or $CO_2$.

3. The method according to claim 1, wherein the hydrofluoropolyether is blended with an amount by weight of 10% or less of hydrofluoropolyether having a boiling point in the range 5–80° C.

4. The method according to claim 1 wherein the foaming agent is in the range of 1–20% by weight of the total composition.

* * * * *